3,317,768
MOTOR
Joseph Ludemann and Heinz Heilmann, Oldenburg, Germany, assignors to Licentia Patent - Verwertungs-G.m.b.H., Frankfurt am Main, Germany
Filed July 5, 1961, Ser. No. 121,900
Claims priority, application Germany, July 11, 1960, L 36,546
8 Claims. (Cl. 310—218)

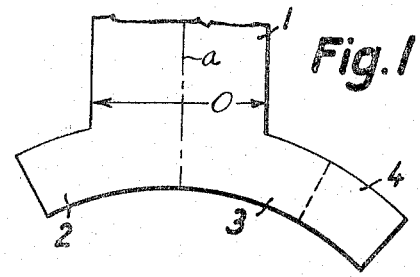
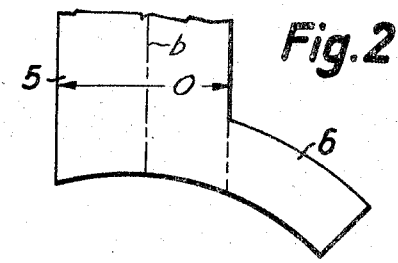
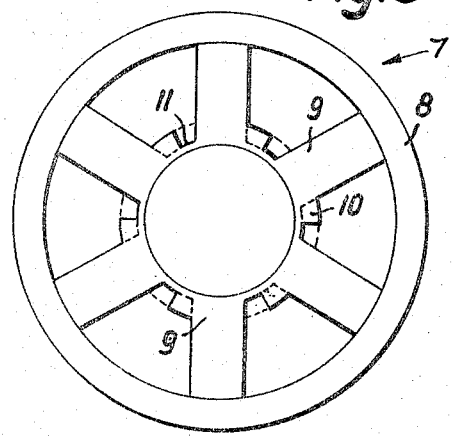
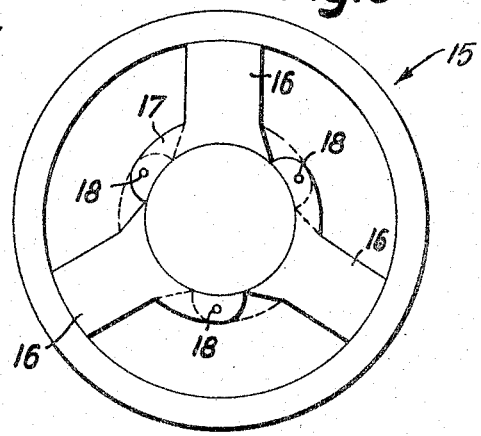
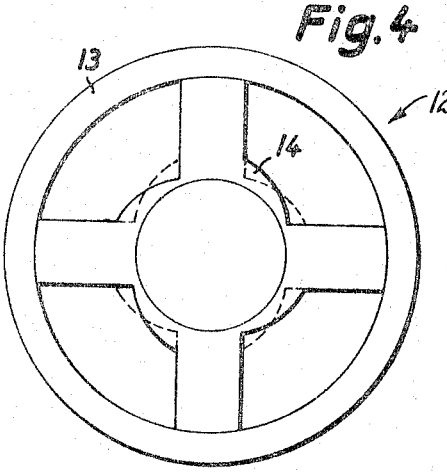
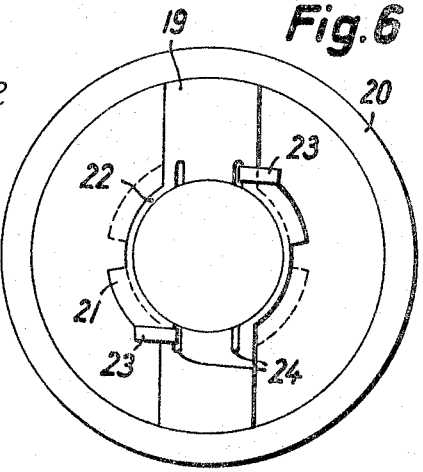
Joseph Ludemann
Heinz Heilmann
Inventors United States Patent Office 3,317,768
Patented May 2, 1967

The present invention relates to electric motors.

More particularly, the present invention relates to the construction of the stator of small alternating current motors having few slots or pole teeth, the pitch of the windings being equal to one pole pitch, which construction is useful for single-phase as well as polyphase motors.

Motors of the above-mentioned type have throughout their construction a magnetic bridge extending from pole to pole, the purpose of which is to effect a magnetic flux distribution to the rotor, which distribution will differ from motor to motor, and also to effect a flux distribution from pole to pole. The desired flux distribution is obtained by appropriately designing the bridges, which may consist either of leakage plates which have been inserted between the edges of adjacent pole teeth or of a tubular insert abutting against the ends of the poles. It is also possible to form these bridges by appropriately shaping the ends of the poles themselves.

One simple way which allows the magnetic bridges to have any desired shape readily imparted to them is to make the stator of small alternating current motors having few slots of two pieces, one of which pieces is a star-shaped pole assembly, a so-called pole star, and the other of which pieces is an annular yoke. The individual poles have the windings pushed on and the pole star is pressed into the annular yoke. The individual poles of the pole star are connected near their pole faces by means of magnetic bridges.

In all of the above arrangements, the electrical drawbacks, caused by the poor winding factor, are tolerated to a greater or lesser extent because of the ease with which such arrangements can be manufactured. Thus, with heretofore known measures, mainly the special configuration of the magnetic bridges of leakage webs, which also produce unsymmetrical stator lamination sections, and partly the narrowing or widening of the air gap under the leakage webs, it has not been possible to produce a satisfactory winding factor.

It is, therefore, an object of the present invention to improve the winding factor and the magnetic field distribution in the air gap, and with this object in view, the present invention resides mainly in a stator for alternating current motors, which stator comprises at least two unsymmetrical stator lamination means which are alternately stacked. More particularly, the stator, which is intended primarily for small or fractional-horsepower motors, is characterized by unsymmetrical stator laminations, or by laminations which only include unsymmetrical plate segments, which laminations or segments are alternately stacked, either individually or in groups.

Additional objects and advantages of the present invention will become apparent upon consideration of the following description when taken in conjunction with the accompanying drawings in which:

FIGURE 1 is an example of an unsymmetrical pole tooth such as may be used in a stator according to the present invention.

FIGURE 2 is another example of an unsymmetrical pole tooth.

FIGURE 3 shows a stator having alternately stacked laminations, each provided with a magnetic bridge that is enlarged at one side.

FIGURE 4 shows a stator similar to that of FIGURE 3 but incorporating differently shaped magnetic bridges.

FIGURE 5 shows a stator made up of laminations incorporating alternately stacked individual unsymmetrical pole segments.

FIGURE 6 shows a stator of the shaded pole type.

Referring now to the drawings, FIGURE 1 shows a stator tooth or pole 1 having projections 2 and 3, the latter being greater, by an amount represented by the portion 4, than the former. Thus, the pole 1 is unsymmetrical, having on one side thereof an enlarged projection 3, so that an unsymmetrical stator cross section is obtained, i.e., the portion 4 is a portion which renders the lamination of which pole 1 is a part unsymmetrical with respect to a radially extending reference axis $a$ which may be considered as passing through the center of the main pole portion whose width is shown as O.

FIGURE 2 shows another embodiment of an unsymmetrical pole, namely, a pole 5 having but one projection 6 which constitutes the portion of unsymmetry with respect to radial reference axis $b$.

The stator poles shown in FIGURES 1 and 2 can be connected to adjacent poles by means of narrow bridges, webs or straps. If this is done with the pole shown in FIGURE 2, this will produce a stator such as is depicted in FIGURE 3, namely, a stator having a star-shaped pole assembly 7 and an annular yoke 8. The term "star-shaped," as used throughout the instant specification and claims, is intended to refer to a shape characterized by a plurality of arms emanating radially from a common center. This stator is a six-slot stator, suited for four-pole and two-pole operations when connected to a three-phase supply mains or, if an appropriate auxiliary circuit is used, when connected to a single-phase mains. The poles 9 are each provided on one side with a projection 10, which thus constitutes an enlargement of the connecting web 11 that joins adjacent poles. The individual laminations are stacked alternately, i.e., the uppermost lamination shown in FIGURE 3 which has each of its projections 10 extending in clockwise direction with respect to the reference axis passing through the respective main pole portion 9 is shown in solid lines and the lamination which is stacked differently, that is to say, the lamination which has each of its projections extending in counterclockwise direction with respect to the reference axis passing through the respective main pole portion, is shown in dashed lines in the region of the webs 11. Thus, while the reference axes of the individual laminations, which per se are similar to each other, are in alignment with each other, the portions of unsymmetry of immediately adjacent lamination means—here constituted by single laminations—are out of alignment with each other. The frequency with which the individual laminations are differently stacked is not graphically represented; the maximum is obtained when each lamination is oriented differently from the adjacent lamination, and the minimum will be when there are simply two groups of laminations which are differently stacked, each group being composed of similarly oriented individual laminations.

FIGURE 4 shows a four-slot stator composed of the star-shaped pole asembly 12 and the annular yoke 13, the connecting webs being shown at 14. It will be noted that the webs are not stepped, as was the case in the embodiment of FIGURE 3, but become progressively narrower. Such an arrangement produces a different type of overlapping of the fluxes. By designing the webs differently, it is thus possible to nest poles of the same pitch differently, thus varying the interaction of the flows of the poles.

FIGURE 5 show a three-slot stator whose star-shaped pole assembly 15 differs from those described above in that it is not composed of a single lamination but of individual pole segments 16 each of which is, in fact, a single tooth having at one side a projection 17 which extends beyond the middle of the slot. The segments, when stacked alternately, will not abut against each other in the plane of any one lamination, but ends of the projections of the pole teeth of adjacent laminations will overlap each other. Suitable means, as, for example, rivets 18, are provided for holding the segments together to form the star-shaped pole assembly. The extent to which the projections overlap each other is a measure of the magnetic linkage and of the overlapping of the pole fluxes.

FIGURE 6 shows an embodiment of the present invention incorporated in a two-pole shaded pole-type motor, whose stator is composed of a star-shaped pole assembly 19 and an annular yoke 20. The unsymmetrical star-shaped portions with the shading pole portion 21 and the narrow web 22 which serves as the stray bridge are differently stacked, as described above, so that the same advantageous possibilities, concerning flux distribution and flux linking, are obtained. Additionally, the shading coils 23 can be inserted in the pairs of slots 24, which must be provided to allow alternate stacking, so as to obtain clockwise or counter-clockwise rotation, as desired.

It will be seen from the above that the projection or bridge extending from each pole to the adjacent pole has an enlarged portion which either abruptly or gradually becomes narrower. According to the present invention, the enlarged portion is so dimensioned that it will normally be magnetically saturated, whereas the remaining narrow or non-enlarged portion is so dimensioned that maximum saturation is attained already upon low induction, i.e., that only a small, and in the extreme case the smallest possible, magnetic flux will flow. In this extreme case, all that remains is the mechanical problem of holding the individual stator laminations together.

By stacking the individual laminations, or the groups of laminations, alternately, the stator is given a symmetrical appearance in which the projections or the one-sided enlargements of the bridges overlap each other or are displaced relative to each other. If the projections or the one-sided bridge enlargements, which are, in effect, a one-sided widening of the pole, extend more than one-half a slot width, this produces a nesting effect of the ends of the poles of adjacent poles, and therefore an advantageous, effective overlapping of the pole fluxes. By arranging the ends of the poles closer together, or by nesting the poles in special cases, there is obtained a better distribution of the air gap induction, i.e., a distribution having fewer harmonics, as well as fewer harmonics in the slots. The resulting larger proportion of the fundamental frequency of the field curve and the larger pole coverage improve the winding factor and the efficiency of the motor.

Additionally, a part of the large offset which is always advantageous in motors having few stator slots, can readily be built into the stator if, instead of alternately stacking consecutive laminations, or groups of laminations which are composed of but a few laminations, the laminations are stacked in groups composed of a larger number of laminations, for example, by providing but two groups of laminations. As a result, the offset in the rotor is reduced to an amount which allows the rotor to be readily built by existing manufacturing techniques.

Another advantage of the present invention is that in the case of fluctuating supply voltage, the speed-torque characteristic of the motor is more stable than the speed-torque characteristic of heretofore known motors. The reactance of the motor according to the instant invention varies less inasmuch as the magnetic connection between two stator teeth consists of a portion which is magnetically unsaturated, or only normally saturated, and a portion which at low induction is already magnetically heavily saturated.

It will be understood that the above description of the present invention is susceptible to various modifications, changes, and adaptations, and the same are intended to be comprehended within the meaning and range of equivalents of the appended claims.

What is claimed is:

1. A stator for alternating current motors, comprising at least one pair of lamination means, said lamination means being similar to each other and each having a main pole portion through whose center passes a radially extending reference axis and a portion which renders the respective lamination means unsymmetrical with respect to its own reference axis, said lamination means being stacked with their reference axes in alignment with each other, one of said lamination means having its portion of unsymmetry extending clockwise with respect to its reference axis and the other of said lamination means having its portion of unsymmetry extending counter-clockwise with respect to its reference axis so that portions of unsymmetry of said two lamination means are out of alignment with each other, each lamination means comprises poles each provided with two lateral projections one extending clockwise and the other counter-clockwise with respect to the reference axis, one of said projections being larger than the other, so much of said one projection which exceeds said other projection in size constituting said portion of unsymmetry.

2. A stator for alternating current motors, comprising at least one pair of lamination means, said lamination means being similar to each other and each having a main pole portion through whose center passes a radially extending reference axis and a portion which renders the respective lamination means unsymmetrical with respect to its own reference axis, said lamination means being stacked with their reference axes in alignment with each other, one of said lamination means having its portion of unsymmetry extending clockwise with respect to its reference axis and the other of said lamination means having its portion of unsymmetry extending counter-clockwise with respect to its reference axis so that portions of unsymmetry of said two lamination means are out of alignment with each other, each stator lamination means comprising an unsymmetrical star-shaped pole assembly and an annular yoke surrounding said assembly, the heads of adjacent poles being connected by magetically conductive bridges, one end portion of each bridge being enlarged.

3. A stator as defined in claim 2 wherein said bridges are stepped.

4. A stator as defined in claim 2 wherein the width of each bridge gradually decreases as it approaches an adjacent pole.

5. A stator as defined in claim 2 wherein said bridges are dimensioned such that in the enlarged end portion of each the normal saturation is not exceeded and that in the non-enlarged end portion already upon low induction the maximum saturation is attained.

6. A stator for alternating current motors, comprising at least one pair of lamination means, said lamination means being similar to each other and each having a main pole portion through whose center passes a radially extending reference axis and a portion which renders the respective lamination means unsymmetrical with respect to its own reference axis, said lamination means being stacked with their reference axes in alignment with each other, one of said lamination means having its portion of unsymmetry extending clockwise with respect to its reference axis and the other of said lamination means having its portion of unsymmetry extending counter-clockwise with respect to its reference axis so that portions of unsymmetry of said two lamination means are out of alignment with each other, each lamination means comprising poles each of which is provided with a lateral projection that extends beyond the middle of the slot into which such projection extends.

7. A stator as defined in claim 6 wherein overlapping projections are secured to each other.

8. A stator as defined in claim 7 wherein rivets are provided for securing overlapping projections to each other.

References Cited by the Examiner

UNITED STATES PATENTS

| | | | |
|---|---|---|---|
| 562,864 | 6/1896 | Stover | 310—218 X |
| 571,181 | 11/1896 | Wood | 310—218 |
| 815,847 | 3/1906 | Mallett | 310—218 |
| 1,756,672 | 4/1930 | Barr | 310—217 |
| 1,922,216 | 8/1933 | Persons | 310—217 X |
| 2,240,652 | 5/1941 | Jenkins | 310—218 X |
| 2,461,296 | 2/1949 | Ordas | 310—259 |
| 2,709,762 | 5/1955 | Naul | 310—259 |
| 2,810,846 | 10/1957 | Hammerstrom | 310—190 X |

FOREIGN PATENTS

| | | |
|---|---|---|
| 545,159 | 12/1952 | Canada. |
| 178,974 | 5/1922 | Great Britain. |

MILTON O. HIRSHFIELD, *Primary Examiner.*

MAX L. LEVY, D. X. SLINEY, *Examiners.*

P. L. McBRIDE, J. J. SWARTZ, *Assistant Examiners.*